United States Patent Office 3,357,986
Patented Dec. 12, 1967

3,357,986
1,2,3 OR 4, AZA,-[5-PIPERDYL OR HYDROCARBYL AMINO] - 10,11 DIHYDRO - 5H - DIBENZO - [a,d]- CYCLOHEPTENE
Frank J. Villani, West Caldwell, N.J., assignor to Schering Corporation, Bloomfield, N.J., a corporation of New Jersey
No Drawing. Filed Sept. 19, 1966, Ser. No. 580,169
11 Claims. (Cl. 260—293)

This application is a continuation-in-part application of my co-pending application Ser. No. 330,263, filed Dec. 13, 1963, now U.S. Patent 3,326,924 patented June 20, 1967 which in turn, is a continuation-in-part application of my now abandoned application Ser. No. 275,237, filed Apr. 24, 1963.

This invention relates to compositions-of-matter classified in the art of chemistry as aza-dibenzocycloheptenes, to processes for making and using such compositions and to intermediates valuable in the manufacture thereof.

The invention sought to be patented in one of its composition aspects is described as residing in the concept of an aza-dibenzocycloheptene, the tricyclic nucleus of which has the following structural formula:

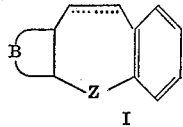

I wherein the dotted line represents an optional double bond; B, together with the carbon atoms to which it is attached, represents a fused pyridine ring, and Z is a member of the group consisting of

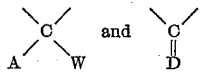

wherein A is a member of the group consisting of piperidyl and

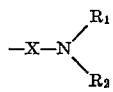

W is a member of the group consisting of H and OH, and D is a member of the group consisting of piperidylidene and

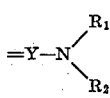

$R_1$ and $R_2$ are members of the group consisting of hydrogen, lower alkyl and together with the nitrogen atom to which they are attached form a heterocycle having 5-6 cyclic atoms, one of said cyclic atoms, other than the aforesaid nitrogen atom, being selected from the group consisting of C, O, and N, all other cyclic atoms being carbon, and X and Y are respectively hydrocarbyl and hydrocarbylidene groups having 2-9 carbon atoms.

The invention sought to be patented in another of its composition aspects is described as residing in the concept of pharmaceutically acceptable acid addition salts of the compounds embraced by Formula I.

The invention sought to be patented in still another of its composition aspects is described as residing in the concept of valuable intermediates which themselves are aza-dibenzocycloheptenes, the tricyclic nucleus of which has the following structural formula:

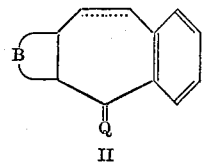

II wherein the definitions for B and the dotted line are the same as defined for Formula I above, and Q is a member of the group consisting of (H,H) and O.

The novel compounds of Formula I are in essence "final products," although as it will be later described, some of these "final products" have the additional utility of being intermediates in the preparation of other "final products."

The nomenclature employed herein is that approved by Chemical Abstracts, 1959, for dibenzocycloheptenes. The identification of the positions in the tricyclic system is exemplified by the following molecular structure for 4-aza-5-(N-methyl-4-piperidylidene) - 10,11 - dihydro - 5H-dibenzo-[a,d]-cycloheptene, a member of the 4-aza series:

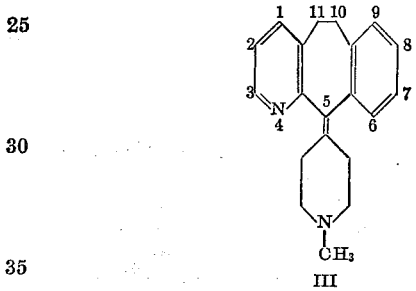

III

Embraced within the composition aspect of the concept as represented by Formula I are the 1-aza-, 2-aza-, 3-aza-, and 4-aza- analogs all of which fall within the definition of B as a fused pyridine ring. It is apparent that the compounds of Formula I are amines attached to an aza-dibenzocycloheptene nucleus at the 5-position through a hydrocarbon connecting link. By way of further definition, those compounds falling within Formula I, wherein W represents hydroxy, are sometimes called "hydroxy compounds" or "carbinols," those wherein W represents hydrogen are sometimes called "saturated compounds" and those having the doubly bound substituent D, are sometimes called "unsaturated compounds" or "alkylidene compounds."

The substituent A, as described herein includes a limited number of amino-hydrocarbyl substituents. Within the definition of A is the substituent piperidyl which includes 3-piperidyl, 4-piperidyl-, N-lower alkyl (preferably methyl)-3-piperidyl; N-lower alkyl (preferably methyl)-4-piperidyl. Included within the definition of A is the group

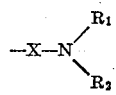

with X being defined as a hydrocarbyl group having 2-9 carbon atoms. Representative of such groups are straight and branched hydrocarbon radicals of which ethyl, propyl, butyl, pentyl, octyl, phenylpropyl, are representatives of the straight chain. (It should be apparent to one skilled in the art that the terms ethyl, propyl and the like are being used in this context to signify a two-carbon or a 3-carbon chain, and the like, one end of which is attached to the 5-position of the tricyclic nucleus and the other end of which is attached to the

group. This context should be applied throughout in the designation of the hydrocarbyl and hydrocarbylidene substituent.) Also embraced within the term X are cyclic hydrocarbyl group such as represented by cyclohexyl, cyclohexylmethyl and the like.

The substituent D is a doubly bound group identical to the piperidyl grouping and —X—NR₁R₂ grouping in A except that the carbon atom of the substituent directly attached to the 5-position of the tricyclic nucleus has one less hydrogen atom and is doubly bound to said position. Embraced within the definition of D are piperidylidene (3-piperidylidene, 4-piperidylidene, N-methyl-3- and 4-piperidylidene) lower hydrocarbylidene having 2–9 carbon atoms such as ethylidene, propylidene, cyclohexylidene, phenylpropylidene and other "ylidene" analogs of X.

The substituent

includes amino, lower alkyl amino (preferably methylamino) and lower di-alkylamino (preferably dimethylamino). The scope of

includes those tertiary cyclic amino groups wherein R₁ and R₂ together with the nitrogen atom to which they are attached form a heterocycle having 5–6 cyclic atoms, one of saic cyclic atoms, other than the aforesaid nitrogen atom, being selected from the group consisting of C, O, and N and all other cyclic atoms being carbon. This aspect includes, pyrrolidino, piperidino, morpholino, piperazino (the last being inclusive of 4-methylpiperazino, 4-(2-hydroxyethyl) - piperazino, 4 - (hydroxy - lower alkoxy)-piperazino and the like).

Compounds having the general Formula I also include those possessing a substituent in the benzenoid portion of the nucleus preferably in the 7- and/or 8-position. The substituent is generally one that does not usually provide for a difference in the kind of physiological property exhibited by the corresponding unsubstituted compound, the difference being rather in degree. Such substituents include lower alkyl, preferably methyl, halogen, preferably chlorine or bromine, pseudo halogen-like trifluoromethyl, hydroxy and lower alkoxy. These benzenoid substituted compounds are considered to be essentially the equivalents of their unsubstituted analogs and as such are fully contemplated as being within the scope of this invention.

The compounds contemplated as falling within Formula I are basic in character and form acid addition salts with acids. These salts sometimes increase solubility and lend themselves better to formulation than do the free bases. Accordingly the pharmaceutically acceptable acid addition salts of the free bases are contemplated as being within the concept in its composition aspect. Such salts include those derived from maleic, salicyclic, succinic, methyl sulfonic, tartaric, citric, hydrochloric, hydrobromic, sulfuric, phosphoric and the like.

The novel compounds of this invention represented by Formula I are characterized by their antihistaminic, antiserotonin and antianaphylactic action and are useful in the treatment of allergic disorders such as urticaria, seasonal rhinitis and pollen sensitivity.

Within the classes of compounds encompassed by this invention, (i.e. the carbinols, the saturated compounds and the alkylidene compounds of each of the 1-aza, 2-aza, 3-aza and 4-aza series), some appear of greater therapeutic utility than others. Although all of the compounds possess the above described properties, there are certain structure activity relationships pertaining to potency and utility. For example, the 4-aza compounds appear more potent than the other position isomers as antihistaminic substances. The piperidylidene compounds appear more potent than dimethylaminopropylidene as antihistamic agents, but the latter group appears to be of greater interest in their effect upon the central nervous system. Compounds having the 3-aza grouping appear also to exhibit antihypertensive properties. The hydroxy compounds and the saturated compounds appear to exhibit properties similar to the alkylidene cogeners but to a lesser extent. Those compounds which are unsaturated at positions 10 and 11 appear somewhat less potent than their saturated analog.

The novel compounds described herein are administered in pharmaceutical formulations comprising the substance in admixture with a pharmaceutical carrier suitable for enteral or parenteral administration. The formulations may be in solid form, as for example tablets and capsules, or in liquid form as for example syrups, elixirs, emulsions, and injectables. In the formulation of pharmaceutical dosage forms there generally is utilized excipients as for example, water, gelatin, lactose, starches, magnesium stearate, talc, vegetable oils, benzyl alcohols, gums, polyalkylene glycols, and petroleum jelly.

In one of its process aspects, the invention sought to be patented resides in the concept of producing a compound of Formula I by reacting a 5-keto-aza-dibenzocycloheptene with an organometallic compound bearing an amino substituted group embraced by the substituent A and hydrolyzing the complex thereby formed. The organometallic reactant may be a Grignard type reagent such as N-methyl-4-piperidyl magnesium halide (or zinc halide), preferably chloride or bromide. This step may be summarized by the following reaction sequence:

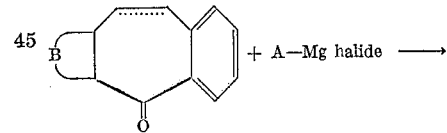

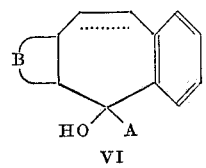

wherein B and the dotted line are as defined herein. This reaction is limited to the production of those carbinols of Formula I (or VI) wherein the substituent A contains at least three carbon atoms separating the amino group from the 5-position of the tricyclic nucleus. Any free amino group, such as a primary or secondary amine, must be protected prior to formation of the organometallic reactant in order to prevent these groups from reacting with the metallo-organic reagent. I prefer to protect free amine groups with benzyl. The carbinol so formed will accordingly contain the benzyl blocking group which is easily cleaved by catalytic hydrogenation to regenerate the corresponding amine.

In a preferred procedure, a 5-keto-aza-dibenzocycloheptene (IV) is added either in solid form or in solution in an inert solvent to a Grignard reagent containing the substituent A which is also in such an inert solvent such as, for example ether, benzene, tetrahydrofuran and the like. Representative of the organometallic reactant are N-methyl-4-piperidyl magnesium chloride, dimethylaminopropyl magnesium chloride, and the like which are prepared in a known manner from magnesium and the corresponding amino alkyl halide. The reaction mixture may be heated, preferably under reflux, after which time it is subjected to hydrolysis. Hydrolysis under practically neutral conditions such as is effected by ammonium chloride results in formation of the carbinol (VI) which is isolated from the reaction mixture by extraction with a water-immiscible solvent such as ether, chlorinated hydrocarbons and the like. The carbinols of Formula I may be utilized as such or in the form of their acid addition salts.

The carbinols are valuable intermediates in the production of the unsaturated compounds of Formula I, that is those compounds wherein Z represents >C=D. The carbinols are relatively easily dehydrated to produce an exocyclic unsaturated compound of Formula I. The dehydration may be effected by heating the carbinol with known dehydrating agents such as alcoholic hydrogen chloride, phosphorous oxychloride, phosphoric acids such as polyphosphoric acid, sulfuric acid, zinc chloride, alkali pyrosulfate and other similarly acting agents. These unsaturated products (wherein Z of Formula I represents >C=D) may be isolated as free bases or in the form of their acid addition salts. The piperidylidene compounds of this class are particularly useful in the treatment of allergies. Thus, the dehydration of the carbinols to produce the corresponding unsaturated analog represents a further aspect of the process concept of the invention sought to be patented.

A further utility of the exocyclically unsaturated compounds described above is that wherein they serve as intermediates in the preparation of the saturated compounds of Formula I, wherein Z represents

These saturated compounds are prepared by catalytic hydrogenation of the double bond preferably with palladium and hydrogen. This reductive step is not selective and if there is a 10,11-double bond, another technique is employed as will be described later herein. The reduction of the 10,11-unsaturated compounds to produce the corresponding saturated 10,11-dihydro analogs is a further aspect of the invention sought to be patented in its process concept.

The saturated compounds of Formula I, wherein Z represents

are also preparable by direct alkylation of an azadibenzocycloheptene according to the following reaction scheme:

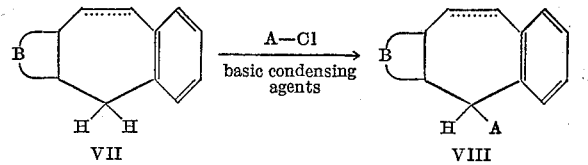

In the foregoing reaction scheme, the substituents A, B and the dotted line have the same meaning as described heretofore. This reaction constitutes the condensation of an organic halide (preferably chloride or bromide) bearing the substituent A, with an appropriate aza-dibenzocycloheptene (VII). The reaction is carried out in an inert solvent such as toluene or xylene, preferably at reflux temperature, and in the presence of a condensing agent such as sodamide or potassium amide. Representative of the halides which may be used in this reaction are dimethylaminopropyl chloride, dimethylaminoethyl chloride and the like. The reaction product is obtained by neutralization of the mixture with mineral acid, followed by treatment with aqueous alkali and extraction with a water immiscible solvent. This method permits the production of saturated compounds, wherein Z represents

having a 10,11-double bond.

A method of preparing the unsaturated compounds analogs wherein the substituent A or D has only two carbon atoms separating the amino moiety from the 5-position of the tricyclic nucleus is that which first involves the condensation of a 5-keto-aza-dibenzocycloheptene (IV) with a bromoacetic ester (preferably ethyl bromoacetate) in the presence of zinc, the well known Reformatsky condensation, which gives rise to a carbethoxy methyl intermediate IX:

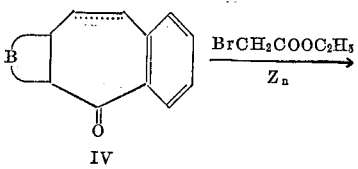

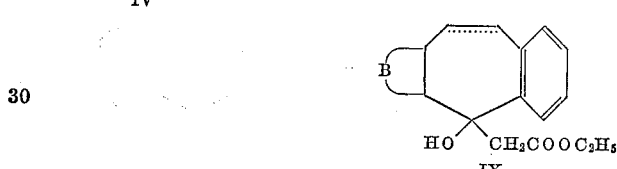

In the foregoing reaction, B and the dotted line have the same significance as ascribed heretofore. The reaction is effected in an inert solvent such as refluxing toluene or xylene and the product, IX, separated therefrom according to methods well known in the art. The ester, IX, is then subjected to dehydration such as by heating with thionyl chloride to afford the exocyclically unsaturated analog, X, which is saponified by treatment with acid or alkali to yield the carboxylic acid, XI. The carboxylic acid, XI, is converted into an amide, XII, by first forming the acid chloride by means of thionyl chloride followed by reaction with the amine HNR₁R₂. This sequence of reactions is depicted in the following scheme and for convenience only the 5-position of the tricyclic system is shown:

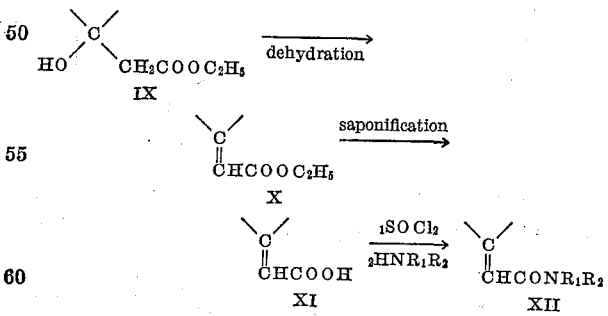

In this reaction sequence, —NR₁R₂ has the same significance as ascribed heretofore but is preferably a tertiary amino group. Selective reduction of the amide group by means of lithium aluminum hydride, for example, yields the amino alkylidene, XIII, which may be further saturated to yield the aminoalkyl, XIV, by catalytic hydrogenation with palladium.

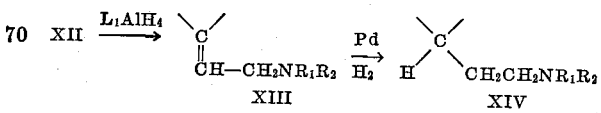

Compounds XIII and XIV are representative of those of Formula I having two carbon atoms separating the amino group —$NR_1R_2$ from the 5-position of the tricyclic nucleus. The last step, that is the catalytic hydrogenation, is not selective and in addition to saturating the exocyclic double bond will also hydrogenate a 10,11-double bond if such is present.

It is apparent that key intermediates in the synthesis of compounds of Formula I are those azadibenzocycloheptenes having a tricyclic nucleus represented by Formula II. Embraced within this representation are 1-aza-5H-dibenzo[a,d]cycloheptene, 2-aza-5H-dibenzo[a,d]cycloheptene, 3-aza-5H-dibenozo[a,d]cycloheptene, 4-aza-5H-dibenzo[a,d]cycloheptene, their 10,11-dihydro analogs, the 5-keto analog of the foregoing and those containing a further substituent in the benzenoid ring as described heretofore. Representative of this latter group are, for example, 4-aza-7-chloro-5H-dibenzo[a,d]cycloheptene, its 5-keto analog and the 10,11-dihydro derivative of both; the corresponding 7- and 8-bromo analogs, 7- and 8-methyl analogs and the like.

The 5-keto intermediates of Formula II (Q=O) are prepared by a variety of procedures of which I prefer an intramolecular cyclization of an ortho-styryl (or ortho-phenethyl)-pyridine carboxylic acid according to the following scheme:

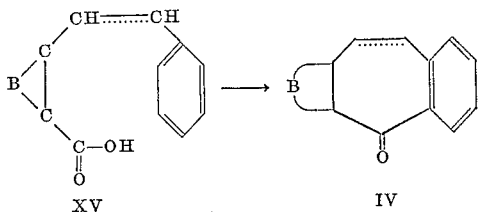

In the foregoing scheme B and the dotted line have the same significance as ascribed heretofore. The cyclization of the ortho-substituted pyridine carboxylic acid (XV), is preferably effected by heating the acid with polyphosphoric acid in a temperature range of about 100° C. to 160° C. whereby the cyclization occurs resulting in the formation of the ketone, IV. It is thus apparent that the choice of the pyridine carboxylic acid determines the particular isomer produced. For example, by starting with 3-styryl-2-pyridine carboxylic acid (XVI), (or 3-phenethyl-2-pyridine carboxylic acid), the 4-aza-ketone (XVII) is produced:

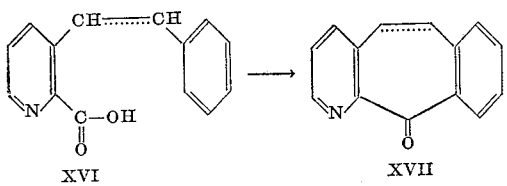

Similarly by starting with 4-styryl (or 4-phenethyl)-3-pyridyl carboxylic acid (XVIIIa), the corresponding 3-aza ketone (IV) is produced; from 3-styryl (or 3-phenethyl)-4-pyridyl carboxylic acid (XVIIIb) there is obtained the 2-aza ketone (IV) and from 2-styryl (or 2-phenethyl)-3-pyridine carboxylic acid (XVIIIc), there is obtained the 1-aza ketone (IV).

The cyclization as depicted above is effected on the pyridine carboxylic acid (XIV). Alternate and equivalent methods are readily apparent to one skilled in the art such as an intramolecular Friedel-Crafts reaction. By this method, the carboxylic acid is first converted to its acid chloride such as by means of thionyl chloride (or phosphorous trichloride or oxalyl chloride, for example) followed by treatment with aluminum chloride whereby cyclization occurs resulting in the formation of IV. The cyclization is carried out generally according to standard techniques for effecting a Friedel-Crafts reaction, namely heating the mixture in an inert solvent such as carbon disulfide, petroleum ether, benzene and the like and isolating the cyclized product therefrom.

The phenethyl pyridine carboxylic acids (XV) may be prepared by catalytic hydrogenation of the corresponding styryl pyridine carboxylic acids or by independent synthesis as set forth later herein. In certain instances as will be shown, the cyclic ketone (IV) having an unsaturation between positions 10 and 11 sometimes are preferably prepared from the 10,11-dihydro analog by dehydrogenation with selenium dioxide or other methods equivalent in its result.

The 1-aza-ketones of Formula IV are preferably prepared by the following sequence of reactions:

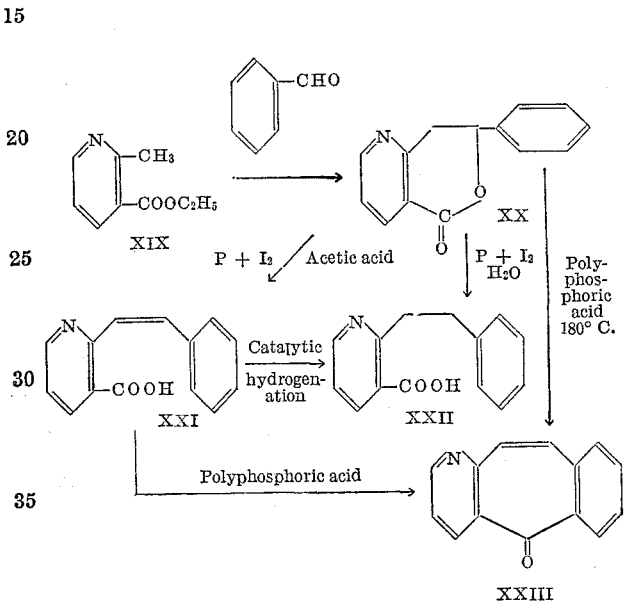

The reaction between benzaldehyde and ethyl 2-methyl nicotinate is carried out in refluxing acetic anhydride and gives rise to 3-carboxy-2-dihydrostilbazole lactone (XX). The lactone is converted directly into the cyclic ketone (XXIII) by heating with polyphosphoric acid. It may also be transformed indirectly via the stilbazole carboxylic acid (XXI) to the cyclic ketone (XXIII) as shown. Treating the lactone with phosphorus and iodine in water, or reducing the stilbazole carboxylic acid (XXI) yields 2-phenethyl nicotinic acid (XXII). This latter compound upon heating with polyphosphoric acid is transformed into the 10,11-dihydro analog of XXIII.

In the foregoing reaction, chemical transformation of compound XIX to compound XX is old in the art but is shown herein to establish a basis for preparing the cyclic ketone (XXIII) and its 10,11-dihydro analog wherein said ketone contains a substituent in its benzenoid portion. It should be apparent to one skilled in the art that these substitution analogs are prepared by using the appropriately substituted benzaldehyde. For example, if a benzaldehyde substituted in the para position, by a member, represented by chlorine, bromine, trifluoromethyl, methyl, and the like, were used in the reaction, the correspondingly substituted lactones and pyridine carboxylic acids are formed and, ultimately, the cyclic ketone (XXIII) or its 10,11-dihydro analog having said substituent in the 7-position. It is, thus, apparent that by starting with a benzaldehyde having a substituent in other positions, it is possible to prepare the correspondingly substituted cyclic ketone (XXIII) and its 10,11-dihydro analog having said substituent appear elsewhere in the benzenoid portion.

The 2-aza-ketones of Formula IV are preferably prepared by the following sequence of reactions:

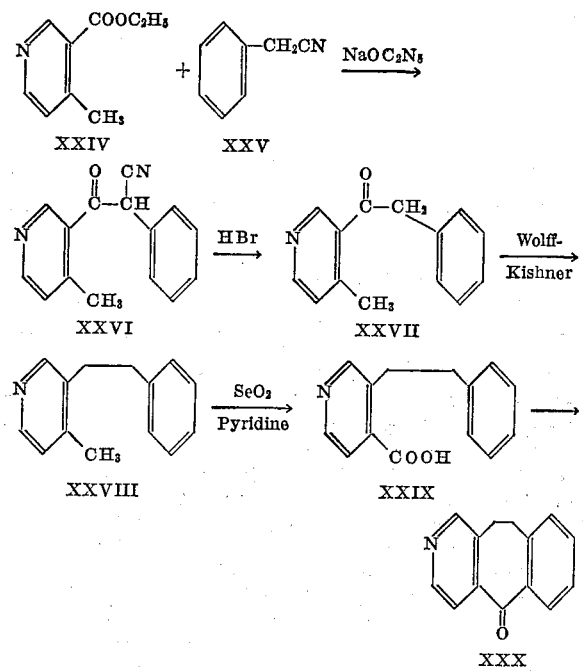

In this reaction sequence, ethyl 4-methyl nicotinate (XXIV) is condensed with a phenylacetonitrile (XXV), preferably by means of sodium alkoxide (ethoxide) in ethanol giving rise to the keto nitrile (XXVI). Conversion to the ketone, XXVII, is effected by heating the keto nitrile with a strong mineral acid, preferably concentrated hydrobromic acid. Alternatively, this step may be effected by heating the keto nitrile with concentrated sulfuric acid whereby the nitrile is transformed into a carboxamide group. This is hydrolyzed and the product decarboxylated by adding water to the reaction mixture and continuing the heating operation. Reduction of the 3-pyridyl ketone, XXVII, is preferably carried out by the well-known Wolff-Kishner reaction which involves heating the ketone with hydrazine hydrate in a high boiling polar solvent such as trimethylene glycol in the presence of alkali, such as sodium or potassium hydroxide. This reduction gives rise to a 3-phenethyl-4-methyl pyridine, XXVIII. This latter compound, upon oxidation with selenium dioxide in pyridine, for example, produces a 3-phenethyl-isonicotinic acid (XXIX) which, upon heating with polyphosphoric acid, undergoes cyclization to form the cyclic ketone, XXX. It is also apparent from this reaction scheme that cyclic ketones having the nucleus shown by compound XXX may be prepared, said compounds also having a further substituent such as chlorine, bromine, trifluoromethyl, methyl, and the like, in the benzenoid portion. In order to obtain such substituted compounds, the appropriately substituted phenylacetonitrile is employed. It is apparent that the use of a para-substituted phenylaceonitrile will ultimately give rise to the cyclic ketone, XXX, having said substituent in the 7-position. With a meta-substituted phenylacetonitrile, a mixture of ketones is obtained, one having the substituent in the 6-position and the other having the substituent in the 8-position. These may be separated either at this final step or the isomeric intermediates may be separated at any one of the steps of the reaction sequence by standard techniques, such as fractional distillation, fractional crystallization, column chromatography, and the like.

The 10,11-dehydro analog of compound XXX is preferably prepared from compound XXX itself by dehydrogenation as effected by selenium dioxide in pyridine or by treating compound XXX with N-bromosuccinimide and then dehydrobrominating the so formed bromo intermediate.

In order to prepare the 3-aza-ketones of Formula IV, the following sequence of reactions is preferred:

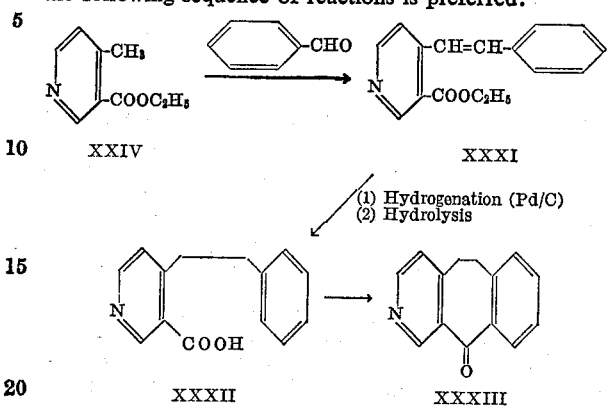

In this reaction sequence, ethyl 4-methyl nicotinate, the same starting substance as used in the 2-aza series, is reacted with benzaldehyde in refluxing acetic anhydride giving rise to the stilbazole carboxylic ester, XXXI. Reduction of this ester catalytically, such as with palladium and hydrogen, followed by hydrolysis of the ester group, produces 4-phenethyl nicotinic acid (XXXII), which upon heating with polyphosphoric acid, is cyclized to form the 3-aza-ketone, XXXIII. Here again, the 7-chloro-, 7-bromo-, 7-trifluoromethyl-, and 7-methyl-substituted ketones are readily prepared by utilizing the appropriately para-substituted benzaldehyde.

The 10,11-dehydro analogs of XXXIII are prepared either by dehydrogenation of the ketone itself as described heretofore, or by hydrolyzing the stilbazole carboxylate, XXXI, to the corresponding carboxylic acid and then heating said acid with polyphosphoric acid. If the cyclization is carried out at elevated temperatures in the range of 190° C., there is predominantly obtained the 10,11-dehydro analog of XXXIII. At lower temperatures, a side product, namely, the lactone of 3-carboxy-4-dihydro stilbazole, is formed. This lactone, when heated with polyphosphoric acid according to the procedure described for the 1-aza series, is transformed into the cyclic ketone.

To prepare the 4-aza-ketones of Formula IV, I prefer to utilize the following sequence of reactions:

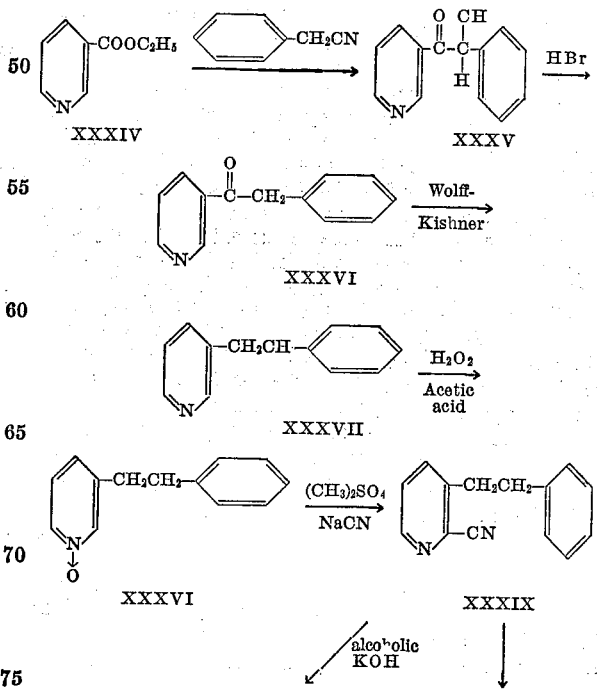

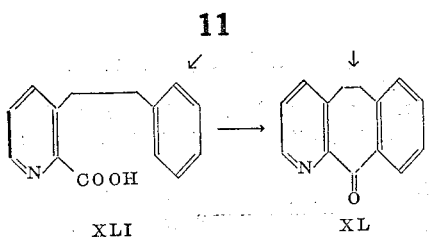

XLI → XL

In this sequence, a nicotinic acid ester, preferably ethyl nicotinate (XXIV), is converted into a 3-phenethyl pyridine (XXXVII) by the same sequence of reactions described for the preparation of the 2-aza-ketones. The condensation with a phenylacetonitrile is preferably carried out in ethanol in the presence of sodium ethoxide; however other condensation agents may also be used, such as sodamide or sodium hydroxide in a benzene or toluene solvent. In place of the Wolff-Kishner reduction, there may also be employed copper chromite in dioxane at about 160° C. under about 1500 lb. pressure of hydrogen. The phenethyl pyridine (XXXVII) is transformed into its N-oxide (XXXVIII) by means of a peroxy acid, such as hydrogen peroxide and acetic acid. Reacting this oxide in turn with dimethyl sulfate and then aqueous sodium cyanide gives rise to 3-phenethyl-2-pyridyl-nitrile, XXXIX. The nitrile is cyclized directly to the 4-aza-ketone, XL, by heating with polyphosphoric acid or it may first be hydrolyzed to the corresponding carboxylic acid, XLI, and then cyclized. In this synthesis, compounds analogous to XL and having a benzenoid substituent are prepared by utilizing the appropriately substitued phenyl-acetonitrile. The 10,11-dehydro analog of XL may be prepared by direct dehydrogenation with selenium dioxide in pyridine, for example, or by any of the methods set forth in the examples which later follow.

3-phenethylpyridine-N-oxide (XXXVIII) is especially valuable in preparing the 4-aza ketone XL in that other transformations may be effected giving rise to the cyclic ketone. In particular, reacting the N-oxide with acetic anhydride gives rise to 2-acetoxy-3-phenethyl pyridine (XXXVIIIa) which is hydrolyzed to the 2-hydroxy analog (XXXVIIIb) by means of aqueous mineral acid, e.g., hydrochloric acid. The hydroxy group is replaced by bromine (by means of phosphorous oxybromide) to yield the 2-bromo-3-phenethylpyridine (XXXVIIIc). Reaction of this latter intermediate with butyl lithium and then with carbon dioxide results in the formation of the carboxylic acid (XLI) which is then cyclized.

It is apparent to one skilled in the art that there are innumerable variations of the foregoing reactions which produce phenethyl- and styryl-pyridine carboxylic acids, all of which are deemed chemically equivalent to those depicted. Indeed any phenethyl- or styryl-pyridine having a carboxyl (or a group convertible thereinto) in a position adjacent to the phenethyl (or styryl) group is a potential and valuable intermediate for producing the aza-dibenzo-cycloheptenones. Further, various aspects of the processes depicted are interchangeable to the extent that the pyridine has the appropriate substitution. For example, the reaction scheme for preparing the 2-aza-ketone, XXX, can be adapted to prepare the 4-aza-ketone (XL) merely by using ethyl 2-methyl nicotinate as starting material. The close analogy between the methods for preparing the 1-aza-ketone (XXIII) and the 3-aza-ketone (XXXIII) is readily apparent. Accordingly, this invention is not particularly concerned with the preparation of phenethyl (or styryl)-pyridine carboxylic acids themselves but is concerned with cyclization of such compounds and their equivalents into aza-dibenzo-cycloheptenones.

[The preparation of the aza-dibenzocycloheptenes, i.e. those compounds of Formula II wherein Q represents (H,H), is accomplished by any of the known methods for converting a keto group to a methylene group. The Wolff-Kishner reduction technique wherein the ketone is treated with hydrazine and potassium hydroxide whereby the carbonyl function is converted to a methylene group is the preferred method. On the other hand, the ketone may first be reduced to the corresponding carbinol which, in turn, is further reduced to methylene. This can be effected by reacting the ketone with lithium aluminum hydride, with zinc dust in ammonia, or by catalytic reduction using platinum oxide or Raney nickel. The carbinols may be converted to the methylene by chlorinating with thionyl chloride and then replacing the chlorine atom with hydrogen by refluxing the chloro-intermediate in the presence of the zinc dust, potassium iodide and acetic acid. The carbinols may be directly reduced such as with iodine and phosphorus in glacial acetic acid. Other methods of course, would be available. In those instances wherein the aza-dibenzo-cycloheptene-5-one intermediate contains the halogeno or trifluoromethyl, substituents in the benzenoid moiety, it is preferred to apply the Wolff-Kishner reduction technique.]

The foregoing descriptions relating to the preparation of the novel compounds of Formula I all utilize a key intermediate of Formula II as an immediate or near immediate precursor. In these afore-described syntheses the substituents A, W, and D are in essence added into an existing tricyclic system by reaction at the 5-position.

It should be apparent to one skilled in the art that there is practically an unlimited number of routes for arriving at compounds of Formula I, said routes involving completion of the tricyclic moiety essentially after the other portions of the molecule have been properly joined. One type of route is that wherein all aspects of the desired product are built into a molecule with the exception of the two-carbon bridge (positions 10 and 11) joining the two ring systems. The joining of the ring systems is effected at the end of synthesis. For example, to prepare the compound of Formula III by this alternate route, cyclization of α-phenyl-α-(N-methyl-4-piperidylidene)-α-(3-carboxymethyl-2-pyridyl)-methane, XLII, gives rise to the ketone intermediate, XLIII which upon reduction such as with hydrazine-hydrate and alkali is converted to III:

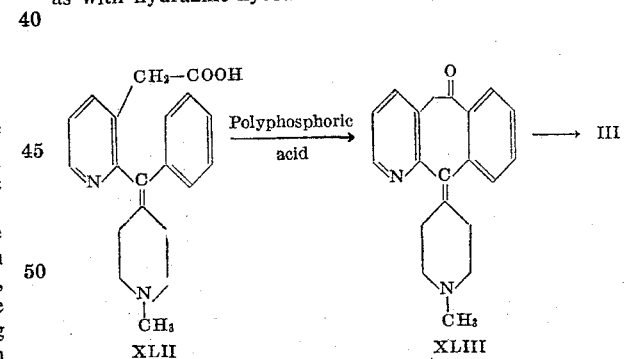

XLII → XLIII → III

The foregoing is set forth merely as a prototype for it is apparent that other known chemical equivalents of the —CH$_2$COOH group may be likewise employed and the cyclization effected by dehydration procedures such as with polyphosphoric acid intra-molecular Friedel-Crafts reactions using aluminum chloride as a catalyst. An acid chloride of XLII with aluminum chloride, or a nitrile in place of the carboxyl, lend themselves readily to the type of intra-molecular condensation shown above. Indeed, in place of the —CH$_2$COOH group, there may be present groups such as —CH$_2$CH$_2$Br, —CH$_2$CH$_2$O-tosyl, —CH$_2$CH$_2$O-mesyl, —CH$_2$CH$_2$OH and the like which undergo cyclization reactions with or without aluminum chloride, directly to III.

The position of the nitrogen atom in the pyridine moiety is generally not critical; when it is in a position different from that shown, the corresponding isomer of XLIII and/or III is produced. Further, the illustration of an N-methyl-4-piperidylidene group is not to be construed as limiting since any of the groups defined for Z is

as set forth heretofore may similarly be employed. It is thus to be understood that the particular reaction schemes and reactants described are solely by way of illustration. It should be readily apparent to one skilled in the art how to extend, adapt, and apply these concepts and syntheses to the production of other compounds of Formula I.

Compounds of which XLII is a prototype are either known or are readily synthesized by ordinary organic transformations. For example, one might begin with (3 - methyl - 2 - pyridyl)-phenyl-N-methyl-4-piperidylene methane (XLIV) prepared by the Grignard reaction of 3-methyl-2-benzoylpyridine and N-methyl-4-piperidyl magnesium chloride followed by dehydration of the carbinol so formed. It is apparent that other agents such as dimethylaminopropyl magnesium chloride and others mentioned herein might equally be employed to give rise to the corresponding "open-chain" analog of XLIV. Halogenating the methyl group of XLIV with N-bromosuccinimide or its equivalent followed by treatment with sodium cyanide results in transformation of the methyl group to an acetonitrile group. This latter compound would be hydrolyzed to the carboxylic acid (XLII) and thence converted to III (through XLIII) or cyclized directly to XLIII.

Alternatively by starting with XLV, the 3-carboxy analog of XLIV, prepared in similar manner, and reacting same with lithium hydroxide and methyl lithium in turn gives rise to α(3-acetyl-2-pyridyl)-α-phenyl-α-N-methyl-4-piperidylidene methane (XLVI) which when subjected to the well known Willgerodt reaction (sulfur and morpholine) rearranges to form XLII. On the other hand, XLVI may be α-brominated to form a bromoacetyl analog which upon cyclization with sulfuric acid or aluminum chloride under the Friedel-Crafts conditions forms the 11-keto isomer of XLIII. This isomer is transformable to III under similar conditions as is XLIII.

Another equivalent procedure is to form the acid chloride of XLV and react the acid chloride with diazomethane to form XLII. Still another procedure is that wherein α(3-(2-hydroxyethyl)-pyridyl)-α-phenyl-, α-(N-methyl-4-piperidylidene)-methane prepared by reactions readily apparent is cyclized to III.

All of these illustrations pertain to the formation of "ylidene" compounds, that is, those having the substituent D, defined heretofore. It is apparent that the corresponding saturated compounds are prepared either by reduction of the exocyclic double bond or by conversion of the intermediary carbinol (precursor of XLIV) by means of phosphorous and iodine in acetic acid to hydrogen.

The foregoing alternate approaches to final compounds of Formula I all involved building the 10,11-two carbon bridge from a substituent on the pyridine moiety. Such chemical construction may also be effected by essentially joining up two substituents—one on the pyridine moiety and the other on the phenyl ring. Such an approach is represented by the reaction of α-(3-methyl-2-pyridyl)-α-o-tolyl-α-(N-methyl-4-piperidylidene)-methane (XLVII) with oxygen or amyl nitrite and sodium t-butoxide whereby ring closure to III occurs. Alternatively, XLVII can be dibrominated by N-bromosuccinimide to form the corresponding di-bromomethyl intermediate which upon treatment with sodium or zinc forms III. Any number of intramolecular condensations of readily synthesized materials like α-(3-carbalkoxymethyl-2-pyridyl)-α-2-aldehydrophenyl-α-(N-methyl-4-piperidylidene)-methane or α-(3-aldehydro - 2 - pyridyl) - α - (2 - cyanomethyl)phenyl - α-(N-methyl-4-piperidylidene)-methane give rise to readily apparent cyclized precursors of III.

A further approach is that whereby essentially all groups are present except for the bonding of the 5-position to the benzenoid ring. For example, reacting 3-phenethyl-2-cyanopyridine with N-methyl-4-piperidyl magnesium chloride forms the intermediary ketone, 3-phenethyl-2-[N-methyl-isonipecotoyl]-pyridine, which upon cyclization forms III. This may be dehydrogenated as described above.

A still further method for preparing compound III, its 10,11-dehydro analog and the 2-aza isomers is that whereby a cycloheptene (prepared as in Preparation E described later therein) represented by, for example, 4-aza-10,11 - dihydro - 5H - dibenzo - [a,d] - cycloheptene, 2-aza - 10,11 - dihydro - 5H - dibenzo - [a,d] - cycloheptene, and the 10,11-dehydro analogs of these, and converted to their 5-lithio derivatives by reaction with butyl lithium in ether at low temperature (−40°). Reaction of the lithio derivative with N-methyl-4-piperidone in ether results in the formation of a condensation product in which an N-methyl-4-hydroxy piperidene is attached to the 5-position. Thus from the reaction of 5-lithio 4-aza-10,11-dihydro - 5H - dibenzo - [a,d] - cycloheptene and N - methyl-4-piperidone the carbinol having the following formula is obtained:

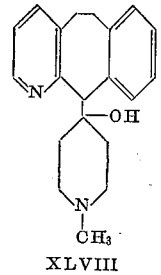

XLVIII dehydration of XLVIII, preferably by first forming an acetate (from acetic anhydride) and pyrolyzing the acetate gives to III. It is apparent that the analogous 2-aza isomer and 10,11-dehydro analogs may be similarly transformed.

These alternate methods are only a few of the many readily apparent and devisable by one skilled in the art of organic synthesis. These, insofar as they apply to the instant invention, are considered within the concept of process aspect of the invention sought to be patented.

The following examples are illustrative of the product and process aspects of the invention sought to be patented. No meaning as to limitation of the invention is to be ascribed to the example.

PREPARATION OF KEY INTERMEDIATES

*Preparation A.*—*1 - aza - 10,11 - dihydro - 5H - dibenzo-[a,d] - cycloheptene - 5 - one and 1 - aza - 5H - dibenzo - [a,d] - cycloheptene - 5 - one*

*Step 1: 2-(2-hydroxyphenethyl)-nicotinic lactone hydrochloride.*—Stir and reflux a mixture of 65 g. ethyl 2-methyl-nicotinate, 57 g. benzaldehyde and 37 ml. acetic anhydride for 20 hours. Cool and pour the mixture into 2.0 N hydrochloric acid. After crystallization, filter and recrystallize the solid from ethanol obtaining 13.5 g. of 2-(2-hydroxyphenethyl nicotinic lactone) hydrochloride, M.P. 183–185° C.

*Step 2: 2-stilbazole-3-carboxylic acid.*—Admix 60 g. of red phosphorous, 20 g. of iodine in 1.5 l. glacial acetic acid and add in portions 176 g. of 2-(2-hydroxyphenethyl)-nicotinic lactone hydrochloride. Reflux for 20 hours and filter the hot solution through a sintered glass funnel. Pour the filtrate into water and filter the precipitate after allowing time for formation and coagulation. Dissolve the precipitate in 2 l. of warm dilute ammonium hydroxide (10–15%). Filter, and neutralize the filtrate with acetic acid. Cool and filter the precipitated 2-stilbazole-3-carboxylic acid. Recrystallize from ethanol, M.P. 219–221° C. (130 g.).

Step 3: 2-phenethyl nicotinic acid.—In a shaker-type hydrogenation (Parr), mix 22 g. of 2-stilbazole-3-carboxylic acid, 200 ml. of ethanol and 20 ml. of 25% aqueous sodium hydroxide. Hydrogenate the mixture at 50 lbs. pressure of hydrogen using freshly prepared Raney nickel catalyst. When the theoretical amount of hydrogen is absorbed (1 mole per mole of acid), filter and concentrate the filtrate by heating on a steam bath. Dissolve the residue in water, acidify with acetic acid and filter the crude phenethyl nicotinic acid. Recrystallize from benzene-hexane, M.P. 162–163° C.

Alternatively, 2-phenethyl-nicotinic acid is prepared by heating 100 gms. of the lactone (step 1) with 1 liter 57% hydroiodic acid while adding 60 g. red phosphorous over a period of 2 hours. Reflux the mixture for 18 hours and filter while hot. Remove most of the excess hydriodic acid by concentrations and neutralize the remaining solution with ammonium hydroxide whereupon 2-phenethyl-nicotinic acid precipitates.

Step 4: 1-aza-10,11-dihydro-5H-dibenzo-[a,d]-cycloheptene-5-one.—Admix 50 g. of 2-phenethylnicotinic acid and 500 g. of polyphosphoric acid and heat at 160–165° C., for 5–6 hours while stirring. Cool, pour the mixture into ice water and neutralize with ammonium hydroxide. Extract with ether. Wash the ether solution with 10% sodium hydroxide solution. Dry the ether layer and concentrate to a residue. Crystallize from hexane obtaining the ketone of this step, M.P. 62–64° C.

Step 5: 1-aza-5H-dibenzo-[a,d]-cycloheptene-5-one.—Dissolve 20 g. of the ketone from step 4 in 150 ml. of acetic acid and add 40 ml. of 30% hydrogen peroxide. Heat in a water bath maintained at 65–70° C. for 24 hours, and pour into ice water. Neutralize with concentrated sodium hydroxide solution and allow to crystallize. Filter, recrystallize from dilute ethanol and air dry, obtaining the N-oxide of the ketone of step 4. To 100 ml. of refluxing acetic anhydride, add 15 g. of the N-oxide prepared above. Reflux the mixture for 10 hours, and then pour into water. Allow to stand several hours and then neutralize with sodium bicarbonate. Extract the mixture with chloroform and evaporate the chloroform extract to dryness. Treat the residue with 100 ml. of 48% hydrobromic acid and 100 ml. of acetic acid and then reflux the mixture for 6 hours. Concentrate in vacuo, dissolve the residue in water and make alkaline with ammonium hydroxide. Extract the mixture with ether. Concentrate the ether solution to a residue. Crystallize from petroleum ether, obtaining 1-aza-5H-dibenzo-[a,d]-cycloheptene-5-one, M.P. 95–96° C.

Preparation B.—2-aza-10,11-dihydro-5H-dibenzo-[a,d]-cycloheptene-5-one and 2-aza-5H-dibenzo-[a,d]-cycloheptene-5-one Step 1: α-(4-methyl)-nicotinoyl-phenylacetonitrile.—Follow the procedure of Preparation D, step 1 using ethyl 4-methylnicotinate.

Step 2: Benzyl-3-(4-methyl)-pyridyl ketone.—Using the product of step 1, follow procedure of Preparation D, step 2.

Step 3: 3-phenethyl-4-methylpyridine.—Using the product of step 3, follow the procedure of Preparation D, step 3.

Step 4: 3-phenethyl-isonicotinic acid.—Reflux a mixture of 8.6 g., 3-phenethyl-4-methylpyridine, 50 ml. dry pyridine, and 12 g. powdered selenium dioxide for 3 hrs. Dilute with $CHCl_3$ and filter. Evaporate filtrate to a residue. Dissolve residue in dilute ammonium hydroxide and extract with ether. Acidify the aqueous layer with acetic acid and filter. Recrystallize from isopropyl ether, obtaining 3.9 g. M.P. 99–101° C.

Step 5: 2-aza-10,11-dihydro-5H-dibenzo-[a,d]-cycloheptene-5-one.—Utilizing the acid from step 4, heated with polyphosphoric acid as in Preparation A, step 4.

Step 6: 2-aza-5H-dibenzo-[a,d]-cycloheptene-5-one.—Dehydrogenate the ketone from step 5 by the procedure of Preparation D, step 7.

Preparation C.—3-aza-10,11-dihydro-5H-dibenzo-[a,d]-cycloheptene-5-one and 3-aza-5H-dibenzo-[a,d]-cycloheptene-5-one Step 1: Ethyl 4-stilbazole-3-carboxylate.—Stir and reflux a mixture of 165 g. of ethyl 4-methyl nicotinate, 106 g. of benzaldehyde and 1 liter of acetic anhydride for four hours. Pour onto ice, filter and recrystallize from benzene obtaining the ester of this step.

Step 2: 3-stilbazole-3-carboxylic acid.—Reflux for six hours a mixture of 50 g. of the ester from step 1, 50 g. of potassium hydroxide, 50 ml. of water and 200 ml. of ethanol. Concentrate to remove the solvents and dissolve the residue in 200 ml. of water. Neutralize with acetic acid and allow the 4-stilbazole-3-carboxylic acid to crystallize filter and dry.

Step 3: 4-phenethyl nicotinic acid.—Hydrogenate 22 g. of 4-stilbazole-3-carboxylic acid according to the analogous procedure described in Preparation A, step 3.

Alternatively, dissolve 20.2 g. of the ester from step 1 in 200 ml. of ethanol and hydrogenate under 50 lbs. pressure of hydrogen in the presence of 5 g. of 5% palladium-on-carbon catalyst at room temperature. Saponify the so-obtained ethyl 4-phenethyl nicotinate in a standard manner.

Step 4: 3-aza-10,11-dihydro-5H-dibenzo-[a,d]-cycloheptene-5-one.—Admix 80 g. of 4-phenethyl nicotinic acid and 1 kg. of polyphosphoric acid and follow the analogous procedure of Preparation A, step 4. Recrystallize from benzene-petroleum ether, M.P. 66–67° C.

Step 5: 3-aza-5H-dibenzo-[a,d]-cycloheptene-5-one.—Admix 50 g. of 4-stilbazole carboxylic acid (from step 2) with 1 kg. of polyphosphoric acid and follow procedure of Preparation A, step 4. Recrystallize from benzene-hexane, M.P. 157–158° C.

Preparation D.—4-aza-10,11-dihydro-5H-dibenzo-[a,d]-cycloheptene-5-one and 4-aza-5H-dibenzo-[a,d]-cycloheptene-5-one Step 1: α-Nicotinoyl phenylacetonitrile.—To a refluxing solution of 34 g. of sodium in 500 ml. of absolute ethanol, add dropwise, a mixture of 260 g. of ethyl nicotinate and 133 g. of phenylacetonitrile. After four hours, pour the mixture onto ice and extract with ether. Neutralize the aqueous phase with acetic acid and allow the product to crystallize. Filter, wash with water and air dry. The so-obtained α-nicotinoyl phenylacetonitrile, M.P. 137–141° C. is used in the next step without further preparation.

Step 2: Benzyl 3-pyridyl ketone.—Reflux the nitrile from step 1 for 16 hours with 1.4 liters of concentrated hydrobromic acid. Pour the mixture over ice and allow to crystallize. Filter the hydrobromide salt, suspend the preparation in water and neutralize with sodium carbonate solution. Allow to crystallize, filter and air dry, yield 126 g., M.P. 53–56° C.

Step 3: 3-phenethylpyridine.—Admix 26 g. of the ketone from step 2, 11 g. of sodium hydroxide, 11 ml. of 85% hydrazine hydrate and 175 ml. of diethyleneglycol. Place the mixture in a still and heat at 235–240° C. for 3–4 hours permitting distillation to occur ad libitum. Cool and extract the mixture and the distillate with benzene. Wash the combined benzene extracts with water and distil in vacuo collecting that fraction boiling at 120–128° C./1 mm., 21 g.

Step 4: 3-phenethylpyridine N-oxide.—Heat a mixture of 183 g. of 3-phenethylpyridine, 120 ml. of 30% hydrogen peroxide, and 300 ml. of glacial acetic acid for 20–24 hours at 60–65° C. Pour into ice water and adjust the pH to 8–9 with ammonium hydroxide. Filter and dissolve the precipitate in chloroform. Concentrate to a residue and precipitate with hexane obtaining 150–158 g., M.P. 82–89° C.

*Step 5: 2-cyano-3-phenethyl pyridine.*—While stirring, add 75.6 g. of dimethyl sulfate, dropwise, to 118.8 g. of 3-phenethylpyridine N-oxide. Heat the mixture at 85° C. for 3 hours. Cool and dissolve in 180 ml. of water. Add the aqueous solution dropwise to a stirred solution of 88.2 g. of sodium cyanide in 250 ml. of water, all under an atmosphere of nitrogen with the reaction temperature in the range of 0–5° C. Stir for 6 hours at 0° C., and then allow the mixture to warm to room temperature by standing overnight. Extract with chloroform, wash extracts with water and distil in vacuo, collecting that fraction boiling at 160–167° C. at 0.8 mm. (A higher boiling fraction, 190–195°/1.5 mm., is the 4-cyano isomer which may be transformed into the 2-aza ketone (Preparation B) by the analogous method described herein.)

*Step 6: 4 - aza - 10,11-dihydro-5H-dibenzo-[a,d]-cycloheptene-5-one.*—Stir and heat 99 g. of 2-cyano-3-phenethylpyridine and 5 kg. of polyphosphoric acid at 180° C. for 20–24 hours. Pour onto ice, neutralize with 50% aqueous sodium hydroxide and extract with chloroform. Concentrate to a residue, triturate with hexane and filter obtaining the ketone of this step, M.P. 68–73° C.

*Step 7: 4 - aza-5H-dibenzo-[a,d]-cycloheptene-5-one.*—Reflux a mixture of 15 g. of the ketone from step 6, 15 g. of selenium dioxide and 60 ml. of pyridine for 4 hours under nitrogen. Cool, filter and wash precipitate with ethanol. Combine filtrate and ethanol washings and concentrate in vacuo to a residue. Make filtrate alkaline with ammonium hydroxide and extract with chloroform. Wash chloroform solution with water and concentrate to a residue. Crystallize from isopropyl ether or benzene-hexane, M.P. 118–119° C.

The foregoing preparations set forth methods for synthesizing the ketones of Formula IV which are key intermediates in the preparation of final compounds of Formula I. All these preparations as shown give rise to an azadibenzocycloheptenone unsubstituted in the benzenoid ring. As stated heretofore, to prepare substituted ketones having a substituent at one of the 6, 7, 8 and 9 positions, one merely employs the appropriately substituted reactant. Preparations A and C employ benzaldehyde as an initial reactant while Preparations B and D employed phenylacetonitrile. If these reactants are substituted, the substituent will appear in the benzenoid portion of the azadibenzocycloheptenone, the position dependent upon the position in the initial reactant. A para substituent in the initial reactant gives ultimate rise to a 7-substituted azadibenzocycloheptenone; or ortho substituent appears in the 9-position while a meta substituent gives rise to a mixture consisting of a 6-substituted and an 8-substituted azadibenzocycloheptenone. The initial reactant, the benzaldehyde or the phenylacetonitrile, may thus bear an o-, m- or p-substituent such as methyl, chloro, bromo, trifluoromethyl, methoxy and the like and such substituent will appear in the aforementioned position of the azadibenzocycloheptenone. To separate the mixture of 6- and 8-substituted azadibenzocycloheptenones, I prefer column chromatography whereby the mixture is adsorbed on alumina and eluted with benzene-hexane fractions containing varying proportions of solvent. Combination of like eluates as determined by infra-red, ultraviolet and thin-layer chromatography techniques provides for separation and isolation of the respective isomers. The substituted initial reactant, such as p-chloro-phenylacetonitrile or p-trifluoro-methylbenzaldehyde are either known compounds or are readily prepared by methods well known to one ordinarily skilled in the art.

*Preparation E.—4-azo-10,11-dihydro-5H-dibenzo-[a,d]-cycloheptene*

Reflux a mixture of 40 g. of 4-aza-10,11-dihydro-5H-dibenzo-[a,d]-cycloheptene-5-one, 50 g. of potassium hydroxide, 100 g. of hydrazine hydrate and 350 ml. of trimethylene glycol for 24 hours. Concentrate in vacuo to 30% volume and pour the residue into ice-water. Extract with ether, wash the ether solution with water and concentrate to a residue. Crystallize from aqueous methanol.

In similar fashion, by utilizing any of the ketones of Preparations A–D, and the substitution products thereof as described in the preceding passage, and reacting said ketones as above described, the corresponding azadibenzocycloheptene is obtained.

PREPARATION OF CARBINOLS

*Example 1.—4-aza-5-(N-methyl-4-piperidyl)-10,11-dihydro-5H-dibenzo[a,d]-cycloheptene-5-ol*

Add 17.4 g. of N-methyl-4-chloropiperidine to a stirred mixture containing 3.2 g. of magnesium, 20 ml. of anhydrous tetrahydrofuran, 1 ml. of ethyl bromide and a crystal of iodine. Reflux for two hours, cool to 30–35° C. and add a solution of 13 g. of 4-aza-10,11-dihydro-5H-dibenzo[a,d]-cycloheptene-5-one in 25 ml. of tetrahydrofuran. Stir for five hours, remove the solvent by distillation in vacuo and add 250 ml. of ether. Add 100 ml. of 10% ammonium chloride solution and extract the mixture with chloroform. Concentrate the chloroform solution to a residue and recrystallize from isopropyl ether obtaining 20 g. of the carbinol of this example, M.P. 173–174° C.

By substituting the analogous aza-ketones in the foregoing (the 1-aza, 2-aza, and 3-aza ketones), the corresponding carbinols are obtained.

*Example 2.—1-aza-5-(3-dimethylaminopropyl)-10,11-dihydro-5H-dibenzo[a,d]-cycloheptene-5-ol*

To a stirred mixture of 6.8 g. of magnesium, 150 ml. of anhydrous ether and 1 ml. of ethyl bromide add 39 g. of 3-dimethylaminopropyl chloride. While refluxing, add a solution of 20.9 g. of 1-aza-10,11-dihydro-5H-dibenzo [a,d]-cycloheptene-5-one in 100 ml. of ether and reflux the reaction mixture for three hours. Add 200 ml. of 10% ammonium chloride solution and extract with chloroform. Concentrate to a residue and recrystallize from ether obtaining the carbinol of this example, M.P. 106–109° C.

The methods of Examples 1 and 2 are representative of the formation of the carbinols of Formula I, with Example 1 being applicable to all carbinols and especially preferred for the synthesis of those compounds wherein A represents N-methyl-4-piperidyl. Tetrahydrofuran has greater application as a solvent in these Grignard reactions and permits the use of higher concentrations. These reactions are not satisfactorily applicable to the preparation of carbinols of Formula I having less than three carbon atoms separating the amino group of A from the 5-position of the tricyclic nucleus.

It is evident that any Grignard reagent bearing the substituents A, with the foregoing limitation, may be prepared in the usual manner described herein and substituted into the foregoing procedures to obtain the corresponding carbinol. Representative of such reagents, in addition to those described in Examples 1 and 2 are those wherein A represents: N-ethyl-4-piperidyl, N-methyl-3-piperidyl, 4-piperidyl, N-benzyl-4-piperidyl, di-lower alkylamino lower alkyl such as 3-dimethylaminopropyl, 4 - dimethyl - aminobutyl, 3-(N-methyl-N-ethyl-amino) propyl, 5-dimethylaminopentyl, 8-dimethylaminooctyl, 4-dimethylaminocyclohexyl, 3 - (4 - dimethylaminocyclohexyl)-propyl, 4-dimethylaminocyclohexylmethyl, 3-pyrrolidinopropyl, 3-piperidinopropyl, 3-morpholinopropyl, 3 - (4 - methyl)-piperazinopropyl, 3-(4-(2-hydroxyethyl) piperazino)-propyl, 3-p-dimethylaminophenylpropyl, 3-diethylaminobutyl and the like.

It is also evident that any of the ketones, including the benzenoid substituted ketones, of Preparations A–D when substituted into Examples 1 and 2 with the Grignard reactants described above will give rise to the corresponding carbinol of Formula I.

In order to prepare carbinols of Formula I wherein A contains a primary or secondary amino group, such as 3-methylaminopropyl or 3-aminopropyl, the amino group is first protected by benzylation prior to formation of the Grignard reagent. Thus, utilizing the procedure of Example 2, one would react, for example, 3-(N-methyl-N-benzylamino) - propylmagnesium chloride with the appropriate ketone. Subjecting the carbinol so formed to catalytic debenzylation by methods well known in the art affords the corresponding primary or secondary amine derivative. A similar transformation is applicable to the preparation of carbinols of Formula 1 wherein A represents 4-piperidyl, the reactant being N-benzyl-4-piperidylmagnesium chloride.

It has been stated herein that the substituent A may be a group such as piperazino-lower alkyl or $N_4$-hydroxyethylpiperazino-lower alkyl and the like. These are prepared from a reagent such as 3-piperazinopropylmagnesium chloride or $N_4$ - benzylpiperazinopropylmagnesium chloride followed by transformation of the N-benzyl or N—H group to the appropriately substituted moiety by methods well known in the art.

Following the methods taught by Examples 1 and 2, and utilizing knowledge ascribed to one skilled in the art, the following carbinols are prepared from the reaction of the appropriate ketone and appropriate Grignard reagent (in the following listing, for the sake of brevity, the phrase "10,11 - dihydro - 5H - dibenzo[a,d] - cycloheptene-5-ol" is written as "-dihydrocarbinol" while the 10,11-unsaturated analog is written as "-carbinol." Accordingly in this abbreviated nomenclature the compound of Example 1 would be written as 4-aza-5(N-methyl-4-piperidyl)-dihydrocarbinol):

4-aza-5-(4-piperidyl)-dihydrocarbinol,
4-aza-5-(N-benzyl-4-piperidyl)-dihydrocarbinol,
4-aza-5-(N-methyl-4-piperidyl)-dihydrocarbinol,
4-aza-5-(3-dimethylaminopropyl)-dihydrocarbinol,
4-aza-5-(3-pyrrolidinopropyl)-dihydrocarbinol,
4-aza-5-(4-dimethylaminocyclohexylmethyl)dihydrocarbinol,
4-aza-5-(3-methylaminopropyl)-dihydrocarbinol,
4-aza-5-(3-dimethylaminobutyl)-dihydrocarbinol,
4-aza-5-(3-diethylaminopropyl)-dihydrocarbinol,
4-aza-5-(3(4-methylpiperazino)propyl)-dihydrocarbinol,
4-aza-5-(3-(4-(2-hydroxyethyl)piperazino)propyl)-dihydrocarbinol,
4-aza-5-(3-(methylbenzylamino)propyl)-dihydrocarbinol,
4-aza-5-(2-methyl-3-dimethylamino-propyl)-dihydrocarbinol,
4-aza-5-(2-methyl-3-methylaminopropyl)-dihydrocarbinol,
4-aza-5-(4-piperidyl)-carbinol,
4-aza-5-(N-benzyl-4-piperidyl)-carbinol,
4-aza-5-(N-methyl-4-piperidyl)-carbinol,
4-aza-5-(3-dimethylaminopropyl)-carbinol,
4-aza-5-(3-pyrrolidinopropyl)-carbinol,
4-aza-5-(4-dimethylamino-cyclohexylmethyl)-carbinol,
4-aza-5-(3-methylaminopropyl)-carbinol,
4-aza-5-(3-dimethylaminobutyl)-carbinol,
4-aza-5-(3-diethylaminopropyl)-carbinol,
4-aza-5-(3(4-methylpiperazino)propyl)-carbinol,
4-aza-5-(3-(4-(2-hydroxyethyl)piperazino)propyl)-carbinol,
4-aza-5-(3-(methylbenzylamino)propyl)-carbinol,
4-aza-5-(2-(methyl-3-dimethylamino)propyl)-carbinol,
4-aza-5-(2-methyl-3-methylaminopropyl) - carbinol, and the 1-aza-, 2-aza-, and 3-aza- analogs of the foregoing, as well as their 7-chloro, 7-trifluoromethyl, 8-chloro, 8-methyl-, 9-methyl, 7-bromo-, 6-methoxy- and 7-methyl derivatives.

PREPARATION OF "UNSATURATED" COMPOUND BY DEHYDRATION OF CARBINOLS

*Example 3.—4-aza-5(N-methyl-4-piperidylidene)-10,11-dihydro-5H-dibenzo-[a,d]-cycloheptene*

Heat 5.4 g. of the carbinol of Example 1 and 270 g. of polyphosphoric acid for 12 hours at 140–170° C. Pour into ice water and make alkaline with sodium hydroxide. Extract with ether. Dry ether solution and concentrate to a residue. Crystallize from isopropyl ether, M.P. 124–126° C.

*Example 4.—1-aza-5-(3-dimethylaminopropylidene)-10,11-dihydro-5H-dibenzo-[a,d]-cycloheptene*

Reflux for 8 hours a mixture of 14 g. of carbinol of Example 2, 160 ml. of glacial acetic acid and 50 ml. of concentrated hydrochloric acid. Concentrate to a residue in vacuo, make alkaline and extract with chloroform. Concentrate the chloroform solution to a residue and distil, collecting that fraction boiling at 175–180° C./1 mm.

PREPARATION OF "UNSATURATED" COMPOUNDS HAVING A 2-CARBON CHAIN

*Example 5.—4-aza-5-(3-dimethylaminoethylidene)-10,11-dihydro-5H-dibenzo-[a,d]-cycloheptene*

Step 1.—To a stirred mixture of 13 g. zinc (20 mesh), 33.4 g. of ethyl bromoacetate in 400 ml. of benzene-toluene (1:), add dropwise a solution of 41.4 g. of 4-aza-10,11-dihydro-5H-dibenzocycloheptene-5 - one. Heat for two hours on a steam bath, add 13 g. zinc and continue heating for four hours. Cool, add 10% acetic acid and separate layers. Extract aqueous phase with benzene and combine benzene fractions. Concentrate to a residue and distil in vacuo obtaining 4-aza-5-carbethoxymethyl-10,11-dihydro-5H-dibenzo-[a,d]-cycloheptene-5-ol.

Step 2.—Dehydrate the carbinol of step 1 by heating at 90–100° C. 20 g. of the carbinol with 100 ml. of acetic anhydride containing 1–2% sulfuric acid. After three hours, concentrate in vacuo, dilute with water, neutralize and extract with ether. Concentrate to a residue and distil in vacuo to obtain 4-aza-5-carbethoxymethylidene-10,11-dihydro-5H-dibenzo-[a,d]-cycloheptene.

Step 3.—Reflux 15 g. of the methylidene compound from step 2 with 15 g. potassium hydroxide, 50 ml. water and 150 ml. ethanol for six hours on a steam bath. Concentrate to a residue, add water and extract with ether. Neutralize aqueous layer with acetic acid and allow product to crystallize. Filter and recrystallize from aqueous methanol obtaining 4-aza-5-carboxymethylidene-10,11-dihydro-5H-dibenzo-[a,d]-cycloheptene.

Step 4.—Reflux 12 g. of the acid from step 3 with 50 ml. of thionyl chloride. Concentrate in vacuo, add 50 ml. of benzene and evaporate to a residue. Take up in 150 ml. of benzene and while stirring add a solution of 9 g. of dimethylamine in benzene. Stir and reflux for four hours and then pour into water. Make alkaline with sodium carbonate and extract with benzene. Concentrate in vacuo to obtain 4-aza-5-dimethylcarboxamido - 10,11-dihydro-5H-dibenzo-cycloheptene. Purify by recrystallization from methanol.

Step 5.—Add an ether solution of 10 g. of the amide from step 4 to a suspension of 3 g. of lithium aluminum hydride in 250 ml. of ether. Stir for two hours, add water and separate layers. Concentrate ether to a residue obtaining 4-aza-5 - dimethylaminoethylidene - 10,11 - dihydro-5H-dibenzocycloheptene. Purify by distillation in vacuo.

All of the carbinols described heretofore when subjected to the dehydration methods of Examples 3 and 4, or obvious equivalents thereof give rise to the corresponding exocyclic unsaturated product. The procedure of Example 5 is used to prepare "ethylidene" compounds of Formula I. Representative of the unsaturated compounds prepared by these methods and their equivalents are those listed below wherein the abbreviated nomenclature described heretofore is again employed with the modification that "carbinol" is dropped in favor of "heptene," thus the compound of Example 3 is described by this abbreviation as 4-aza-5(N-methyl-4-piperidylidene)-dihydro-heptene:

3-aza-5-(4-piperidylidene)-dihydroheptene,
3-aza-5-(N-benzyl-4-piperidylidene)-dihydroheptene,
3-aza-5-(N-methyl-4-piperidylidene)-dihydroheptene,
3-aza-5-(3-dimethylaminopropylidene)-dihydroheptene,
3-aza-5-(3-pyrrolidinopropylidene)-dihydroheptene,
3-aza-5-(4-dimethylaminocyclohexylmethylidene)-dihydroheptene,
3-aza-5-(3-methylaminopropylidene)dihydroheptene,
3-aza-5-(3-dimethylaminobutylidene)-dihydroheptene,
3-aza-5-(3-diethylaminopropylidene)-dihydroheptene,
3-aza-5-[3-(4-methylpiperazino)propylidene]-dihydroheptene,
3-aza-5-[3-(4-(2-hydroxyethyl)piperazino)propylidene]-dihydroheptene,
3-aza-5-[3-(methylbenzylamino)propylidene]-dihydroheptene,
3-aza-5-[(2-methyl-3-dimethylamino)propylidene]-dihydroheptene,
3-aza-5-[(2-methyl-3-methylamino)propylidene]-dihydroheptene,
3-aza-5-(2-dimethylaminoethylidene)-dihydroheptene,
3-aza-5-(2-pyrrolidinoethylidene)-dihydroheptene,
3-aza-5-(2-dibenzylaminoethylidene)-dihydroheptene,
3-aza-5-(4-piperidylidene)-heptene,
3-aza-5-(N-benzyl-4-piperidylidene)-heptene,
3-aza-5-(N-methyl-4-piperidylidene)heptene,
3-aza-5-(3-dimethylaminopropylidene)-heptene,
3-aza-5-(3-pyrrolidinopropylidene)-heptene,
3-aza-5-(4-dimethylaminocyclohexylmethylidene)-heptene,
3-aza-5-(3-methylaminopropylidene)-heptene,
3-aza-5-(3-dimethylaminobutylidene)-heptene,
3-aza-5-(3-diethylaminopropylidene)-heptene,
3-aza-5-[3(4-methylpiperazino)propylidene]-heptene,
3-aza-5-[3-(4-(2-hydroxyethyl)piperazino)propylidene]-heptene,
3-aza-5-[3-(methylbenzylamino)propylidene]-heptene,
3-aza-5-[(2-methyl-3-dimethylamino)propylidene]-heptene, and the 1-aza, 2-aza and 4-aza analogs of the foregoing, as well as their 7-chloro, 7-trifluoromethyl, 8-methyl-, 9-methyl-, 8-chloro, 7-bromo-, 6-methoxy- and 7-methyl derivatives.

PREPARATION OF SATURATED COMPOUNDS

*Example 6.—1-aza-5(3-dimethylaminopropyl)-10,11 - dihydro-5H-dibenzo[a,d]-cycloheptene*

Hydrogenate in a Parr shaker a solution of 6.8 g. of the compound of Example 4 in 100 ml. of ethanol in the presence of 0.5 g. of platinum oxide under about 50 lbs. pressure of hydrogen until an equivalent quantity of hydrogen is absorbed. Filter and concentrate the filtrate to a residue and distil collecting that fraction boiling at 165–170°/1 mm.

This method is generally applicable to the preparation of the "saturated" compounds of Formula I which are also saturated at the 10,11-position. The catalytic hydrogenation will generally reduce a 10,11-double bond and thus to prepare such 10,11-unsaturated compounds, the method of Example 7 is applicable.

*Example 7.—4-aza-5(dimethylaminoethyl)-5H - dibenzo-[a,d]-cycloheptene*

Add 18.2 g. of 4-aza-5H-dibenzo-[a,d]-cycloheptene (Preparation E) to a solution of sodamide (from 2.5 g. sodium) in 200 ml. of anhydrous ammonia. Stir for two hours and then add slowly 10.7 g. of dimethylaminoethyl chloride. After one hour displace the ammonia with ether and then reflux for 6–8 hours. Pour into ice water and extract with ether. Concentrate to a residue and distil in vacuo to obtain the compound of this example.

This method is applicable to the preparation of all the "saturated" compounds of Formula I, the 10,11-dihydro as well as the unsaturated analogs thereof.

"Saturated" compounds of Formula I, prepared by the methods of Examples 6 and 7, or obvious equivalents thereof are set forth in the following representative listing with the abbreviated nomenclature employed as before:

1-aza-5-(4-piperidyl)-dihydroheptene,
1-aza-5-(N-benzyl-4-piperidyl)-dihydroheptene,
1-aza-5-(N-methyl-4-piperidyl)-dihydroheptene,
1-aza-5-(3-dimethylaminopropyl)-dihydroheptene,
1-aza-5-(3-pyrrolidinopropyl)-dihydroheptene,
1-aza-5-(4-dimethylaminocyclohexylmethyl)-dihydroheptene,
1-aza-5-(3-methylaminopropyl)-dihydroheptene,
1-aza-5-(3-dimethylaminobutyl)-dihydroheptene,
1-aza-5-(3-diethylaminopropyl)-dihydroheptene,
1-aza-5-[3(4-methylpiperazino)propyl]-dihydroheptene,
1-aza-5-[3-(4-(2-hydroxyethyl)piperazino)propyl]-dihydroheptene,
1-aza-5-[3-(methylbenzylamino)propyl]-dihydroheptene,
1-aza-5-(2-methyl-3-dimethylamino-propyl)-dihydroheptene,
1-aza-5-(2-methyl-3-methylamino-propyl)-dihydroheptene,
1-aza-5-(2-dimethylaminoethyl)-dihydroheptene,
1-aza-5-(2-pyrrolidinoethyl)-dihydroheptene,
1-aza-5-(2-dibenzylaminoethyl)-dihydroheptene,
1-aza-5-(4-piperidyl)-heptene,
1-aza-5-(N-benzyl-4-piperidyl)-heptene,
1-aza-5-(N-methyl-4-piperidyl)-heptene,
1-aza-5-(3-dimethylaminopropyl)-heptene,
1-aza-5-(3-pyrrolidinopropyl)-heptene,
1-aza-5-(4-dimethylaminocyclohexylmethyl)-heptene,
1-aza-5-(3-methylaminopropyl)-heptene,
1-aza-5-(3-dimethylaminobutyl)-heptene,
1-aza-5-(3-diethylaminopropyl)-heptene,
1-aza-5-[3(4-methylpiperazino)propyl]-heptene,
1-aza-5-[3-(4-(2-hydroxyethyl)piperazino)propyl]-heptene,
1-aza-5-[3-methylbenzylamino)propyl]-heptene,
1-aza-5-(2-methyl-3-dimethylamino-propyl)-heptene,
1-aza-5-(2-methyl-3-methylamino-propyl)-heptene,
1-aza-5-(2-dimethylaminoethyl)-heptene,
1-aza-5-(2-pyrrolidinoethyl)-heptene,
1-aza-5-(2-dibenzylaminoethyl)-heptene, and the 2-aza-, 3-aza, and 4-aza analogs of the foregoing, as well as their 7-chloro, 7-trifluoromethyl, 8-methyl-, 9-methyl-, 7-bromo-, 6-methoxy- and 7-methyl derivatives.

PREPARATION OF PHARMACEUTICAL SALTS

*Example 8.—4-aza-5-(N-methyl-4-piperidylidene)-10,11-dihydro-5H-dibenzo-[a,d]-cycloheptene dimaleate*

To a solution containing 4.3 g. of 4-aza-5-(N-methyl-4-piperidylidene)-10,11-dihydro - 5H - dibenzo[a,d] - cycloheptene in 55 ml. of ethyl acetate, add a solution of 3.45 g. of maleic acid dissolved in ethyl acetate. Filter the resulting precipitate and recrystallize the desired product from an ethyl acetate-methanol mixture to yield 4-aza-5-(N-methyl-4-piperidylidene)-10,11-dihydro - 5H - dibenzo[a,d]-cycloheptene dimaleate, M.P. 152–154° C.

I claim:
1. A compound of the group consisting of aza-5H-dibenzo-[a,d]-cycloheptenes having the molecular formula:

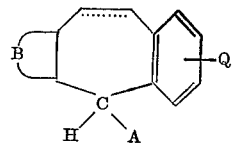

wherein the dotted line represents an optional double bond, B, together with the carbon atoms to which it is attached, represents a fused pyridine ring, and A is a member of the group consisting of 3-piperidyl, 4-piperidyl, N-lower alkyl-3-piperidyl, N-lower alkyl-4-piperidyl, and —$XNR_1R_2$; $R_1$ and $R_2$ being members of the group consisting of hydrogen, lower alkyl and together with the nitrogen atom to which they are attached form a heterocycle having 5–6 cyclic atoms, one of said cyclic atoms other than the aforesaid nitrogen atom being selected from the group consisting of C, O, and N and all other cyclic atoms being carbon, said heterocycles being selected from the group consisting of pyrrolidino, piperidino, morpholino, piperazino, lower alkyl piperazino, hydroxy lower alkyl piperazino, and hydroxy lower alkoxy piperazino; X being a lower alkylene having 2–9 carbon atoms and Q is a member of the group consisting of hydrogen, hydroxy, halogen, lower alkyl, lower alkoxy, and trifluoromethyl.

2. A compound of claim 1 wherein B represents a fused pyridine ring having the nitrogen atom in the 1-position of the tricyclic nucleus.

3. A compound of claim 1 wherein B represents a fused pyridine ring having the nitrogen atom in the 2-position of the tricyclic nucleus.

4. A compound of claim 1 wherein B represents a fused pyridine ring having the nitrogen atom in the 3-position of the tricyclic nucleus.

5. A compound of claim 1 wherein B represents a fused pyridine ring having the nitrogen atom in the 4-position of the tricyclic nucleus.

6. A 2-aza-5H-dibenzo-[a,d]-cycloheptene compound of claim 1 wherein A is dimethylaminopropyl and Q is hydrogen.

7. A 3-aza-5H-dibenzo-[a,d]-cycloheptene compound of claim 1 wherein A is dimethylaminopropyl and Q is hydrogen.

8. A 4-aza-10,11-dihydro-5H-dibenzo-[a,d]-cycloheptene compound of claim 1 wherein A is dimethylaminoethyl and Q is hydrogen.

9. A 4-aza-10,11-dihydro-5H-dibenzo-[a,d]-cycloheptene compound of claim 1 wherein A is N-methyl-4-piperidyl and Q is hydrogen.

10. A 4-aza-10,11-dihydro-5H-dibenzo-[a,d]-cycloheptene compound of claim 1 wherein A is N-methyl-4-piperidyl and Q is chloro.

11. A 4-aza-10,11-dihydro-5H-dibenzo-[a,d]-cycloheptene compound of claim 1 wherein A is dimethylaminoethyl and Q is chloro.

References Cited

UNITED STATES PATENTS

| | | | |
|---|---|---|---|
| 3,014,911 | 12/1961 | Engelhardt | 260—293 |
| 3,040,043 | 6/1962 | Schuler et al. | 260—243 |
| 3,073,847 | 1/1963 | Doebel et al. | 260—294.7 |
| 3,086,972 | 4/1963 | Jucker et al. | 260—293 |

OTHER REFERENCES

Winthrop et al.: J. Org. Chem., vol. 27, pp. 230–240 (1962).

WALTER A. MODANCE, *Primary Examiner.*

A. D. SPEVACK, *Assistant Examiner.*

UNITED STATES PATENT OFFICE
CERTIFICATE OF CORRECTION

Patent No. 3,357,986                                  December 12, 1967

Frank J. Villani

It is hereby certified that error appears in the above numbered patent requiring correction and that the said Letters Patent should read as corrected below.

Column 3, line 42, for "saic cyclic atoms" read -- said cyclic atoms --; column 5, lines 35 and 49, for "wherein", each occurrence, read -- (wherein --; same column 5, lines 36 to 39 and lines 51 to 54, the formula, each occurrence, should appear as shown below instead of as in the patent:

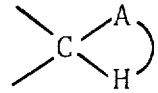

column 9, formula XXV, for that portion of the formula reading "NaOC$_2$N$_5$" read -- NaOC$_2$H$_5$ --; same column 9, line 75, for "N-bromosuccinimide" read -- N-bromsuccinimide --; column 10, formula XXXV, for that portion of the formula reading

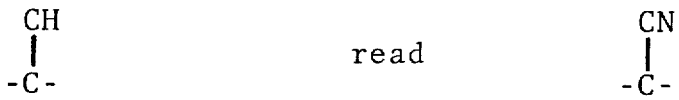

formula XXXVII, for that portion of the formula reading "-CH$_2$CH-" read -- -CH$_2$CH$_2$- --; line 72, for "XXXVI" read -- XXXVIII --; column 14, line 16, for "40°" read -- 40° C. --; column 16, line 16, for "3-stilbazole", in italics, read -- 4-stilbazole --, in italics; column 17, line 51, for "or ortho" read -- an ortho --; line 71, for "4-azo", in italics, read -- 4-aza --, in italics; column 20, line 28, for "(1:)" read -- (1:1) --.

Signed and sealed this 21st day of January 1969.

(SEAL)
Attest:

EDWARD M. FLETCHER, JR.                      EDWARD J. BRENNER
Attesting Officer                                 Commissioner of Patents